United States Patent [19]
Sahara et al.

[11] 3,772,583
[45] Nov. 13, 1973

[54] POWER SUPPLY CIRCUIT

[75] Inventors: Hiroshi Sahara, Tokyo; Tamiji Nagai, Kanagawa; Hisafumi Yamada, Tokyo, all of Japan

[73] Assignee: Sony Corporation, Tokyo, Japan

[22] Filed: Oct. 24, 1972

[21] Appl. No.: 299,849

[30] Foreign Application Priority Data
Nov. 5, 1971   Japan.............................. 46/102996

[52] U.S. Cl........................ 321/15, 321/18, 321/47
[51] Int. Cl. ............................................ H02m 7/00
[58] Field of Search................................ 321/15, 47

[56] References Cited
UNITED STATES PATENTS
3,478,258   11/1969   Nagai.................................... 321/15
3,713,018   1/1973   Tscheuschner...................... 321/15

*Primary Examiner*—William M. Shoop, Jr.
*Attorney*—Lewis H. Eslinger et al.

[57] ABSTRACT

Alternating current at one of a plurality of different voltages is converted to a predetermined direct current voltage by a rectifying circuit which includes a plurality of capacitors and a rectifier connected in series with a pair of AC input terminals to charge the capacitors in such a manner as to divide the voltage between the capacitors. One of the capacitors has a pair of output terminals connected across it and a transistor switch is connected in parallel with the rectifier and the remaining capacitor to cause the current charge from the remaining capacitor to be delivered to the capacitor connected between the output terminals. A detecting circuit detects the voltage value of the input AC voltage and produces a detected output response which causes a control circuit connected to the transistor switch to change the manner of the rectifying operation of the rectifying circuit.

8 Claims, 5 Drawing Figures

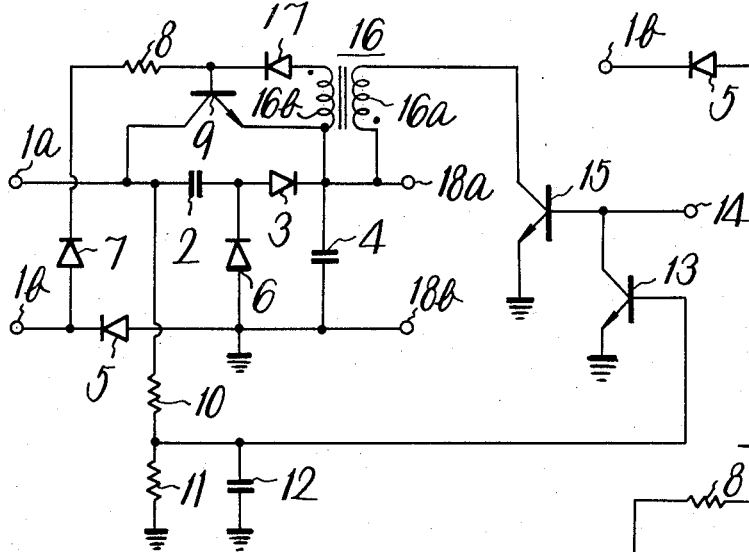
Fig.1
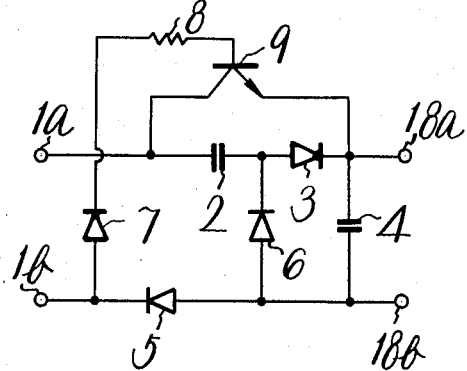
Fig.3
Fig.2

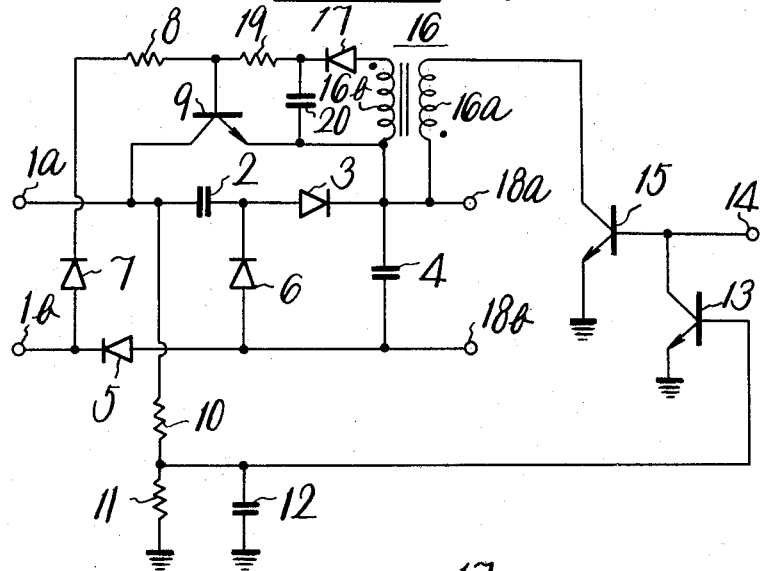
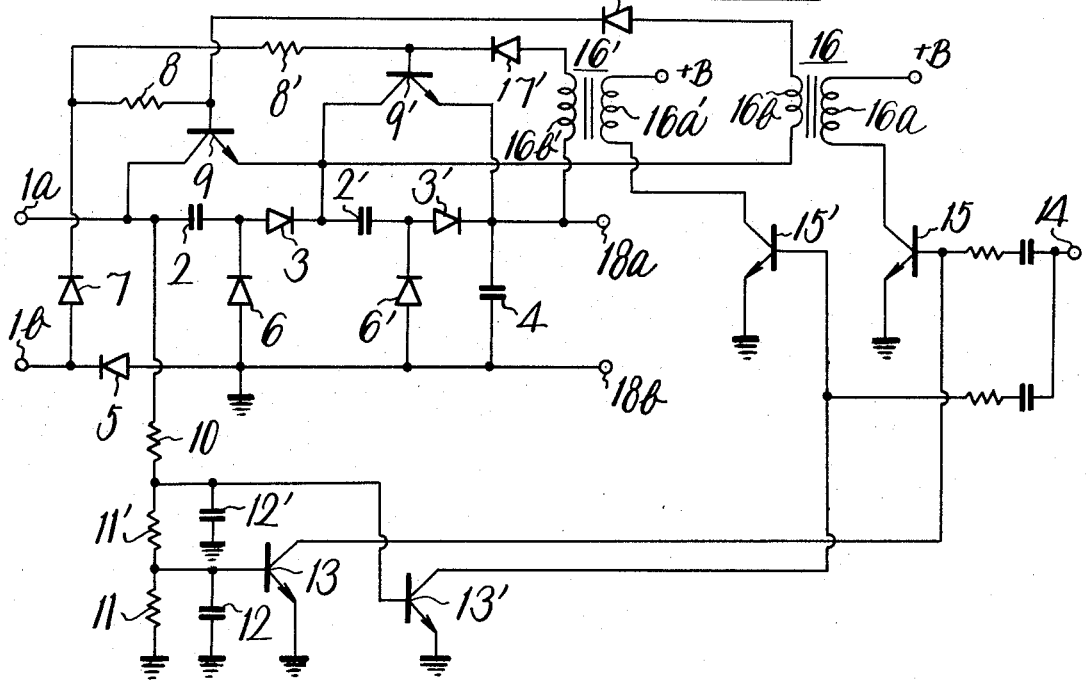

POWER SUPPLY CIRCUIT

BACKGROUND OF THE INVENTION

This invention relates generally to direct current power supply circuits, and more particularly to power supply circuits capable of producing a substantially constant direct current voltage from various alternating current sources of different operating voltages.

At present, two kinds of commercial alternating current voltage sources such as, for example, 110 and 220 volts are used in some European countries. Accordingly, it is necessary in such countries that a direct current power source or supply circuit for use in television receivers, radio receivers, tape recorders, and so on, be able to produce a substantially constant direct current voltage from such different kinds of alternating current voltage sources.

In some prior art direct current supplies a power transformer is used and its tap connections are changed to accommodate different alternating current voltages. The direct current voltage is produced by rectifying this converted alternating current voltage. Such conventional direct current power supply circuits, however, require an expensive power transformer which is also large in size. A further disadvantage of such systems is that it is necessary to change the tap connection of the power transformer to adapt to the power source of each country. If the appliance user neglects to make this adjustment, either the fuses in the appliance are blown or the appliance is damaged. A still further disadvantage of many prior art DC power systems is that they generate an undesirable amount of heat.

SUMMARY OF THE INVENTION

The above and other disadvantages are overcome by the present invention of a rectifying circuit for converting alternating current (AC) voltage applied to a pair of input terminals from an external source into a direct current voltage at a pair of output terminals. The rectifying circuit comprises a series connection of at least a first capacitor, a first unidirectional device and a second capacitor connected between the input terminals with the second capacitor also being connected across the output terminals so that when the AC voltage is applied to the input terminals the capacitors are charged through the undirectional device in such a manner as to divide the DC voltage between the capacitors. Switching means are connected in parallel with the series connection of the first capacitor and the undirectional device to cause the current charge from the first capacitor to be selectively delivered to the second capacitor. Control means connected to the rectifying circuit changes the rectifying operation thereof by controlling the switching means in response to a signal produced by detecting means which is representative of the detected voltage value of the AC input voltage. Thus for relatively low AC input voltages the switching means is caused to operate as a undirectional device to provide half wave rectification whereas for relatively high AC input voltages the switching means allows the output capacitor to be charged from the remaining capacitor during half cycles of the AC input of a given polarity.

In one preferred embodiment the switching means comprises a transistor having its collector and emitter electrodes connected to the opposite ends of the series connection of the first capacitor and the unidirectional device and its base electrode connected to one of the input terminals through a second unidirectional device. The control means includes control signal supply means connected between the base and emitter electrodes of the switching transistor for supplying, from a separate control signal input terminal, a control signal which is in phase with the AC input signal. Second switching means connected between the control signal input terminal and the control signal supply are controlled by the detected output from the detecting means to transmit the control signal from the separate input terminal to the control signal supply means in response to the voltage value of the AC voltage received at the input terminals.

It is an object of the present invention to provide an improved power supply circuit for producing a substantially constant direct current voltage under the application of one of at least two different alternating current voltages from different alternating current electric power sources.

Another object of the invention is to provide a power supply circuit which is capable of producing a substantially constant direct current voltage from one of at least two different alternating current voltages without utilizing a power transformer.

Yet another object of the invention is to provide a power supply circuit for producing a rectified constant direct current voltage from various different alternating current voltages in which the manner of the rectifying operation is automatically changed in response to variations in the alternating current voltage supplied thereto.

Other objects, features and advantages of the invention will be more redily understood upon consideration of the following detailed description of certain preferred embodiments of the invention, taken in conjunction with the accompanying drawings.

BRIEF DESCRIPTION OF THE DRAWINGS

FIG. 1 is a schematic diagram of one embodiment of a power supply circuit according to the present invention;

FIGS. 2 and 3 are equivalent circuits for use in explaining the embodiment shown in FIG. 1;

FIG. 4 is a schematic diagram of a second embodiment of the present invention; and FIG. 5 is a schematic diagram of a third embodiment of the present invention.

DESCRIPTION OF CERTAIN PREFERRED EMBODIMENTS

A description will hereinafter be given of a first preferred embodiment of a power supply circuit according to the invention with reference to FIG. 1. An AC voltage is applied to two input terminals 1a and 1b from a commercial AC voltage source (not shown). The input terminal 1a is connected through a first capacitor 2 to the anode of a unidirectional element or device such as a diode 3, the cathode of which is connected through a second capacitor 4 to the anode of a unidirectional element or device such as a diode 5. The cathode of the diode 5 is connected to the other input terminal 1b. The anode of the diode 5 is also connected to the anode of a unidirectional element or device such as a diode 6 and to the circuit ground. The cathode of the diode 6 is connected to the anode of the diode 3. The capacity of the first capacitor 2 is same as that of the second capacitor 4.

The input terminal 1b is further connected to the anode of a unidirectional element or device such as a diode 7, the cathode of which is connected through a resistor 8 to the base of an NPN-type, switching transistor 9. The collector of transistor 9 is connected to the input terminal 1a and its emitter is connected to the cathode of the diode 3. The above mentioned elements form a rectifying circuit portion, which is described in detail in the U.S. Pat. No. 3,478,258 which was issued on Nov. 11, 1969 and assigned to the same assignee as that of the present invention.

In accordance with the present invention, the input terminal 1a is further connected to a resistor 10 which is connected to the circuit ground through a resistor 11. The resistor 11 is connected in parallel with a third, smoothing capacitor 12. The connection point between the resistors 10 and 11 is connected to the base of an NPN-type transistor 13. The emitter of the transistor 13 is grounded while its collector is connected to a control signal input terminal 14. The resistance values of the resistors 10 and 11 are selected such that the voltage appearing across the resistor 11 when an AC voltage of 220 volts, for example, is impressed across the input terminals 1a and 1b is enough to make the transistor 13 conductive but when an AC voltage of 110 volts, for example, is impressed across the input terminals 1a and 1b, the voltage appearing across the resistor 11 makes the transistor 13 nonconductive.

A sine wave signal or rectangular wave signal, by way of example, with the same phase as that of the AC input voltage is applied to the terminal 14. The collector of the transistor 13 is also connected to the base of an NPN-type transistor 15, the emitter of which is grounded. The collector of the transistor 15 is connected to one lead of the primary winding 16a of a transformer 16. The other lead of the primary winding 16a is connected to the cathode of the diode 3 to apply the DC voltage obtained across the capacitor 4 to the primary winding 16a. Output terminals 18a and 18b are connected to the respective leads of the second capacitor 4 for a DC voltage output.

A secondary winding 16b of the transformer 16 is connected at one lead to the emitter of the transistor 9 and at its other lead to the anode of a unidirectional element or device such as a diode 17. The cathode of the diode 17 is connected to the base of the transistor 9.

In operation, when an AC voltage of 220 volts is impressed across the input terminals 1a and 1b, the voltage across the capacitor 12, namely across the base-emitter junction of the transistor 13 is great enough to make the transistor 13 conductive and thereby short the control signal applied to the base of the transistor 15 to the circuit ground. Accordingly, in this case a control signal applied to the input terminal 14 is not applied to the transformer 16, that is, to the base- emitter junction of the transistor 9. Therefore, an equivalent circuit of the rectifying portion of the power supply in the case where the AC input voltage is 220 volts is shown in FIG. 2 in which the elements 10, 11, 12, 13, 14, 15, 16 and 17 are eliminated.

When a positive half cycle of an AC voltage is impressed between the input terminals 1a and 1b in such a manner that the input terminal 1a is positive while the other input terminal 1b is negative, in the equivalent circuit shown in FIG. 2 a surge of current passes in turn from the input terminal 1a to the other input terminal 1b through the capacitor 2, the diode 3, the capacitor 4, and the diode 5 to thereby charge the capacitors 2 and 4 with the input voltage. Because the input terminal 1b is negative the base-emitter junction of the transistor 9 is reverse biased with the result that the transistor 9 is made nonconductive. The voltages $V_1$ and $V_2$ of the capacitors 2 and 4, respectively, produced by the charging are expressed as follows with the assumption that the capacities of the capacitors 2 and 4 are taken as $C_1$ and $C_2$, respectively, and the AC voltage across the input terminals 1a and 1b is Vin:

$$V_1 = [\ C_2/(C_1 + C_2)\ ]\ Vin$$
$$V_2 = [\ C_1/(C_1 + C_2)\ ]\ Vin$$

Thus Vin is divided between the capacitors 2 and 4. If the capacitors 2 and 4 are selected equal in capacity, $V_1 = V_2$ is obtained.

When a negative half cycle of the AC voltage is impressed across the input terminals 1a and 1b in such a manner that the input terminal 1a is negative while the input terminal 1b is positive, the diode 5 is made nonconductive with the result that the current does not flow through the capacitors 2 and 4. However, since the input terminal 1b is positive, the base of the transistor 9 is supplied with the positive voltage through the diode 7 and the resistor 8. Accordingly, the base-emitter junction of the transistor 9 is forwardly biased, so that the transistor 9 becomes conductive.

Since a load is connected between both ends of the capacitor 4, the voltage $V_1$ across the capacitor 2 normally becomes greater than the voltage $V_2$ across the capacitor 4. For this reason, when the transistor 9 becomes conductive a surge of current passes through the series circuit which includes the capacitor 2, the collector-emitter junction of the transistor 9, the capacitor 4 and the diode 6. That is, the charge stored on the capacitor 2 is discharged through this series circuit to thereby charge the capacitor 4. The discharge of the capacitor 2 is stopped when $V_1 = V_2$.

As will be apparent from the foregoing, when an AC voltage of 220 volts is impressed across the input terminals 1a and 1b of the power supply circuit, it sequentially repeats the operations mentioned above to produce across both ends of the capacitor 4, that is, between the output terminals 18a and 18b, a DC output voltage which has a voltage value about one-half of the AC input voltage.

If, however, an AC voltage of 110 volts is impressed across the input terminals 1a and 1b of the circuit shown in FIG. 1, the voltage derived across the capacitor 12 does not make the transistor 13 conductive, so that the transistor 13 is kept nonconductive and the transistor 15 is made conductive. A control signal in the form of a sine wave or a rectangular waveform which is in phase with the AC signal impressed across the input terminals 1a and 1b, is applied from an external source (not shown) to the input terminal 14 and amplified by the transistor 15. The amplified control signal is then applied through the transformer 16 to the base-emitter junction of the transistor 9.

Since the transistor 9 is thus supplied at its base with an AC voltage having the same phase as that of the AC voltage applied to the input terminal 1a, an equivalent circuit of the rectifying portion of the circuit is illustrated in FIG. 3. Reference character R represents the equivalent of the impedance of the diode 7 and the resistor 8 of the circuit of FIG. 2. In the equivalent circuit if a positive half cycle of the AC input voltage is impressed across the input terminals 1a and 1b in such a manner that the input terminal 1a is positive while the input terminal 1b is negative, the base-emitter junction of the transistor 9 is biased in the forward direction and the transistor 9 is made conductive. Accordingly, current flows from the input terminals 1a and 1b through the collector-emitter junction of the transistor 9, the capacitor 4, and the diode 5 with the result that the capacitor 4 is charged with the rectified input voltage.

On the other hand, if a negative half cycle of the AC input voltage is impressed between the input terminals 1a and 1b in such a manner that the input terminal 1a is negative while the input terminal 1b is positive, the diode 5 and the base-emitter junction of the transistor 9 are reverse biased with the result that the diode 5 and the transistor 9 are made non-conductive and no current flows therethrough.

As is apparent from the foregoing, when an AC voltage of 110 volts is impressed across the input terminals 1a and 1b, the circuit sequentially repeats the above operations and becomes a half wave rectifying circuit to deliver across the capacitor 4 and the output terminals 18a and 18b a DC output voltage having the same voltage as the AC input voltage.

Thus, with the invention, when either of the AC voltages of 110 or 220 volts is impressed across the input terminals 1a and 1b, the AC voltage is automatically detected to vary the rectifying circuit in operation and to provide across the output terminals 18a and 18 b a substantially constant, predetermined DC voltage without employing a power transformer.

If the power supply circuit according to the invention is employed as a DC power supply circuit for an electronic instrument such as a television receiver, a radio receiver, a stereo apparatus or the like, the electronic instrument can be operated in a country where any one of the two kinds of AC electric power sources is employed.

In order to allow the transformer 16 to be lightweight and compact a signal of high frequency (for example, the horizontal sync pulse in the case of a television receiver which utilizes the DC power supply) is used as the control signal applied to terminal 14. In this case, when an AC voltage of 110 volts is impressed across the input terminals 1a and 1b, the high frequency control signal applied to the input terminal 14 appears between the base and emitter electrodes of the transistor 9 to rapidly switch it between its conductive and non-conductive states irrespective of the polarity of the AC input voltage applied to terminals 1a and 1b. Accordingly, when a positive half cycle of the AC voltage is impressed across the input terminals 1a and 1b, for example, in such a manner that the input terminal 1a is positive while the input terminal 1b is negative, the positive voltage applied to the input terminal 1a is sampled with the conductive and nonconductive states of the transistor 9 and is then fed to the output terminals 18a and 18b.

When the negative half cycle makes the terminal 1a negative the diode 5 prevents current flow. It is also possible to control the level of the DC output voltage obtained across the output terminals 18a and 18b by controlling the frequency of the control signal, ie. within certain limits the lower the frequency of the control signal, the lower will be the DC output voltage.

FIG. 4 shows a modified form of the embodiment of FIG. 1 in which a signal of high frequency is used as the control signal at terminal 14 and the control signal obtained at the transformer secondary winding 16b is rectified to always apply an operative voltage to the base-emitter junction of the transistor 9. This embodiment is substantially same as that of FIG. 1 except that a resistor 19 is inserted between the cathode of the diode 17 and the base of the transistor 9 and the cathode of the diode 17 is connected through a capacitor 20 to the emitter of the transistor 9. The resistor 19 and the capacitor 20 act as a smoothing filter so that the transistor 9 is always made unidirectionally conductive when the input AC signal is 110 volts, but since the collector-emitter junction of the transistor 9 acts as a diode, the embodiment of FIG. 4 operates in substantially the same manner as the embodiment of FIG. 1.

Referring now more particularly to FIG. 5 still another embodiment of the invention is depicted in which a substantially constant DC voltage is obtained across the output terminals 18a and 18b when one of three AC voltages of 110, 220 or 330 volts is impressed across the input terminals 1a and 1b. The embodiment of FIG. 5 is substantially a superposition of two circuits of the type shown in FIG. 1 so that the same and primed reference numerals are employed in FIG. 5.

Thus in addition to the embodiment disclosed in FIG. 1 a resistor 11' is inserted in series between the resistors 10 and 11 and a capacitor 12' is connected between the junction of the resistor 10 and the resistor 11' and the circuit ground. This junction point is also connected to the base electrode of an NPN transistor 13' whose emitter electrode is connected to the circuit ground and whose collector electrode is connected to the base electrode of an NPN transistor 15'. The base electrode of the transistor 15' is also connected through a resistor and a capacitor to the control signal input terminal 14. The emitter electrode of the transistor 15' is connected to the circuit ground and the collector electrode is connected to one lead of a primary winding 16a' of a transformer 16'. The other lead of the winding 16a' is connected to a source of positive voltage B+. The primary winding 16a is likewise connected in series between an external source voltage B+ and the collector electrode of the transistor 15.

The secondary winding 16b' of the transformer 16' has one lead connected to the output terminal 18a and the other lead connected to the anode of a diode 17'. The cathode of the diode 17' is connected to the base electrode of an NPN transistor 9'. The cathode of the diode 17' is also connected through a resistor 8' to the cathode electrode of the diode 7. The collector electrode of the transistor 9' is connected to the cathode electrode of the diode 3 and the emitter electrode of the transistor 9' is connected to the output electrode 18a.

Instead of having the cathode electrode of the diode 3 connected directly to the output electrode 18a as in the embodiment of FIG. 1, in the embodiment of FIG. 5 the cathode of the diode 3 is connected to one lead of a capacitor 2' whose other lead is connected to the anode electrode of a diode 3' and the cathode electrode of a diode 6'. The cathode electrode of the diode 3' is connected to one lead of the capacitor 4 and to the output terminal 18a. The anode electrode of the diode 6' is connected to the other lead of the capacitor 4 and the output terminal 18b. In all other respects the embodiment of FIG. 5 is substantially the same as the embodiment depicted in FIG. 1.

In the embodiment of FIG. 5 the capacitors 2, 2' and 4 are selected to be equal in capacity and the resistance values of the resistors 10, 11' and 11 are selected such that the transistors 13, 13', 15 and 15' allow the control signal applied to the input terminal 14 to be impressed across the base-emitter junction of each of the switching transistors 9 and 9' in response to the various magnitudes of the AC input voltage at the terminals 1a and 1b. When an AC voltage of 110 volts is impressed across the input terminals 1a and 1b, the control signal at terminal 14 is applied between the base and emitter electrodes of each of the transistors 9 and 9'; when an AC voltage of 220 volts is impressed across the input terminals 1a and 1b, the control signal is applied between the base and emitter electrodes of the transistor 9 only; and when an AC voltage of 330 volts is impressed across the input terminals 1a and 1b, no control signal is applied to either of the transistors 9 and 9'. The embodiment of FIG. 5 otherwise operates as in the foregoing embodiments and its description is omitted for the sake of brevity.

It is to be understood that a substantially constant DC voltage can be also obtained from a plurality of different AC voltages by a circuit which is constructed in substantially the same manner as the embodiment of FIG. 5. Also, although the above description refers to the case where a substantially constant DC voltage is obtained from the AC voltages of 110 volts, 220 volts and so on, it should be apparent that a constant DC voltage can be obtained from other AC voltages by adjusting the capacities of the capacitors 2, 2' and 4.

Futher, it will be apparent that the same effects mentioned above can be achieved by a circuit in which different circuit elements such as PNP-type transistors, for example, are employed instead of those used in the illustrated embodiments. Furthermore in other embodiments other forms of semiconductor switches are substituted for the switching transistors in the present embodiments.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A direct current power supply circuit comprising:
   a. a pair of input terminals for receiving alternating current voltage,
   b. a pair of output terminals for delivering direct current voltage,
   c. a rectifying circuit connected between the input and output terminals for converting the alternating current voltage to the direct current voltage, the rectifying circuit including a series connection of at least a first capacitor, a first unidirectional device and a second capacitor connected between the input terminals, the second capacitor being connected across the output terminals, the first unidirectional device providing a unidirectional current flow to charge the first and second capacitors in such a manner as to divide the voltage between the first and second capacitors and first switching means connected across the series connection of the first capacitor and the first unidirectional device to selectively supply the current charge from the first capacitor to the second capacitor,
   d. detecting means for detecting the voltage value of the alternating current voltage received by the input terminals and for generating a detected output signal representative of that voltage value,
   e. control means connected to the rectifying circuit for changing the rectifying operation thereof by controlling the switching cycle of the first switching means, the control means including means for supplying an alternating current control signal from an external source, and second switching means responsive to the detected output signal from the detecting means and connected between the alternating current control signal supply means and the first switching means, the switching operation of the second switching means being thereby controlled by the detected output from the detecting means to transmit the alternating current control signal to the first switching means in response to the voltage value of the alternating current voltage received at the input terminals.

2. A direct current power supply as recited in claim 1 wherein the control means causes the first switching means to operate as a unidirectional device to provide half wave rectification for a first alternating current input voltage applied to the input terminals and causes the first switching means to pass current to charge the second capacitor from the first capacitor during half cycles of a given polarity of a second alternating current input voltage applied to the input terminals, the second input alternating current input being of a greater voltage than the first alternating current input.

3. A direct current power supply circuit as recited in claim 10, wherein the first switching means comprises a transistor having collector and emitter electrodes connected to the ends of the series connection of the first capacitor and the first unidirectional device.

4. A direct current power supply circuit as recited in claim 3, wherein the base electrode of the transistor is connected to one of the input terminals through a second unidirectional device.

5. A power supply circuit for converting alternating current at one of a plurality of predetermined voltages from an external source to direct current voltage comprising:
   a. a pair of input terminals for receiving the alternating current voltage,
   b. at least first and second capacitors connected in series with the input terminals,
   c. rectifier means connected in series and between the first and second capacitors,
   d. first switching means connected in parallel to the series connection of the first capacitor and the rectifier means for forming a conductive path in parallel with the series connection when the switching means is in its conductive state,
   e. a pair of output terminals to deliver a direct current voltage connected to each end of the second capacitor,
   f. means for detecting the voltage value of the alternating current voltage applied to the input terminals and for producing a detected output varying in response to the alternating current voltage value, and g. control means connected to the switching means and supplied both with a control signal from an external source and the detected output, the control means controlling the first switching means with the control signal in response to the detected output.

6. A power supply circuit as recited in claim 5, wherein the control means comprises a transformer and second switching means controlled by the detected output, a primary winding of the transformer being supplied with the control signal through the second switching means and a secondary winding of the transformer being connected to the first switching means.

7. A power supply circuit as recited in claim 6, wherein the control means further includes a diode and the first switching means includes a transistor having its emitter and collector electrodes connected to the opposite ends of the series connection of the first capacitor and the rectifier means and the secondary winding of the transformer is connected between the base and emitter electrodes of the transistor through the diode.

8. A power supply circuit as recited in claim 7, wherein a third capacitor is connected across the series connection of the diode and the secondary winding of the transformer.

* * * * *